Jan. 17, 1967  J. CADIOU  3,298,742
BENCH SEAT
Filed May 11, 1965
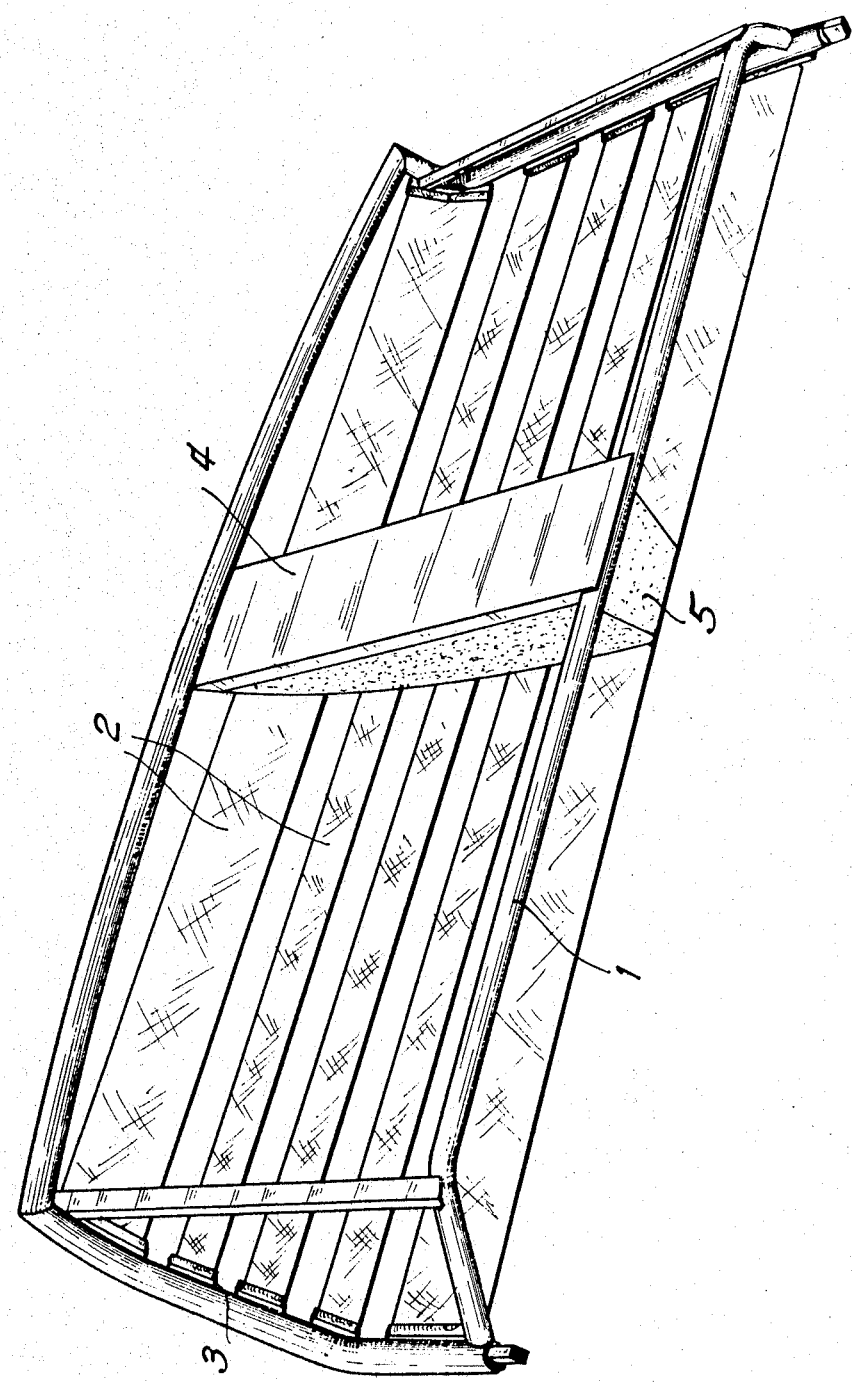

United States Patent Office 3,298,742
Patented Jan. 17, 1967

3,298,742
BENCH SEAT
Jean Cadiou, Paris, France, assignor to Societe Anonyme Andre Citroen, Paris, France
Filed May 11, 1965, Ser. No. 454,833
Claims priority, application France, May 15, 1964, 3,128
2 Claims. (Cl. 297—452)

This invention relates to bench seats, in particular for an automobile.

In bench seats, it is desirable to provide, between the two places on the bench as well as on the back part, a more resistant zone in order to localise, in a more definite manner, the depression of the seat or the back part at the place where the passenger sits. This resistant zone should however be sufficiently supple to permit, if required, a third passenger to seat between the two normal places.

One object of the present invention is to provide a bench seat which satisfies this requirement.

The seat according to the invention is characterised in that its seat part and/or its back part comprises a frame on which elastic straps have been stretched longitudinally, a transverse member of a supple and elastic material being interposed between the frame and the straps at a position midway along the seat.

Preferably the straps are fixed to the transverse member, for example by adhesive or sewing.

One embodiment of a back part of a seat in accordance with the invention is described below, by way of example only, with reference to the single figure of the accompanying drawing which shows the back part in perspective, and seen from the rear.

As is shown in the drawing, the back part comprises a rigid frame 1 on which elastic straps 2 have been stretched. These straps can, for example, be formed by a web of which the warp is made up of elastic threads and of which the threads have been coated with rubber after weaving. The ends of the straps are hooked onto catches 3 rigid with the frame.

The frame 1 comprises an iron support plate 4, at the rearward part thereof, disposed at a position midway along the seat. Between this plate 4 and the straps 2 is disposed a transverse member 5 made of a supple and elastic material having essentially the mechanical properties of a polyether foam. This transverse member 5 is trapezoidal in section so as to effectively resist pressures which would deform it laterally. The depth of the transverse member diminishes from the bottom of the back part up to its upper edge in accordance with the curvature of the back part.

The straps 2 are fixed to the transverse member 5 so that their elasticity is equally divided between the two places on the bench.

The back part can, if desired, be provided with an elastic covering not shown.

It will be evident that the invention is not limited to the embodiment described and illustrated but includes all variants. For example, the base of the seat could be formed in a similar manner.

I claim:
1. A bench seat having a seat part and a back part for accommodating a plurality of persons and wherein at least one of said parts comprises
    a rigid frame,
    a plurality of elastic straps stretched laterally across said frame in parallel spaced relationship to one another and being secured to said frame at the ends of the straps,
    said frame including a rigid supporting member extending transversely of said straps at a lateral mid-position along the length of the seat, and
    a member of foam material extending transversely of the straps at said lateral mid-position and being mounted on said rigid supporting member of the frame and providing support for said straps midway between said ends of the latter.
2. A bench seat according to claim 1; wherein each of said straps is secured, midway between said ends, to said member of foam material.

References Cited by the Examiner
UNITED STATES PATENTS

| 2,169,197 | 8/1939 | Reed | 297—455 |
| 2,633,185 | 3/1953 | Emberson | 297—452 |
| 2,769,485 | 11/1956 | Shapiro | 297—460 |
| 2,897,879 | 8/1959 | Brown et al. | 297—456 |
| 3,049,730 | 8/1962 | Wall et al. | 297—455 |
| 3,081,131 | 3/1963 | Brueder | 297—455 |

FOREIGN PATENTS

| 243,801 | 3/1963 | Australia. |
| 250,422 | 3/1964 | Australia. |
| 449,660 | 7/1948 | Canada. |

FRANK B. SHERRY, *Primary Examiner.*
CASMIR A. NUNBERG, FRANCIS K. ZUGEL,
*Examiners.*